United States Patent
Krönlein et al.

(10) Patent No.: US 12,076,685 B2
(45) Date of Patent: Sep. 3, 2024

(54) GAS SCRUBBER FOR REMOVING PARTICLES FROM AN EXHAUST GAS AND AN EXHAUST GAS DISPOSAL SYSTEM WITH A GAS SCRUBBER

(71) Applicant: DAS Environmental Expert GmbH, Dresden (DE)

(72) Inventors: Martin Krönlein, Dresden (DE); Ralph Wiesenberg, Dresden (DE)

(73) Assignee: DAS Environmental Expert GmbH, Dresden (DE)

( * ) Notice: Subject to any disclaimer, the term of this patent is extended or adjusted under 35 U.S.C. 154(b) by 685 days.

(21) Appl. No.: 17/345,298

(22) Filed: Jun. 11, 2021

(65) Prior Publication Data
US 2021/0387129 A1    Dec. 16, 2021

(30) Foreign Application Priority Data
Jun. 16, 2020    (DE) .................. 10 2020 115 890.4

(51) Int. Cl.
*B01D 47/08*    (2006.01)
*B01D 47/02*    (2006.01)
*B01D 47/10*    (2006.01)

(52) U.S. Cl.
CPC ........... *B01D 47/08* (2013.01); *B01D 47/027* (2013.01); *B01D 47/10* (2013.01)

(58) Field of Classification Search
CPC ...... B01D 47/08; B01D 47/027; B01D 47/10; B01D 47/06; B01D 47/16; B01D 53/78;
(Continued)

(56) References Cited

U.S. PATENT DOCUMENTS 4,157,249 A    6/1979 Namy
4,544,379 A *  10/1985 Elliott .................. B05B 3/1021
                                        95/224
(Continued)

FOREIGN PATENT DOCUMENTS

CN    103127792 A    6/2013
CN    109970128 A    7/2019
(Continued)

OTHER PUBLICATIONS

Translation of JP2017018894A, accessed Apr. 1, 2024 (Year: 2017).*

*Primary Examiner* — Christopher P Jones
*Assistant Examiner* — Phillip Y Shao
(74) *Attorney, Agent, or Firm* — Rogowski Law LLC

(57) ABSTRACT

A gas scrubber and a waste gas treatment system with a gas scrubber for removing particles from a waste gas has a housing with a waste gas inlet and a waste gas outlet. A substantially circular plate member defining an axis of rotation is rotatably arranged in the housing. Waste gas fed into the housing via the waste gas inlet is directed toward approximately the center of the circular plate member. An outlet nozzle sprays a liquid, especially a cleaning liquid or a scrubbing liquid, onto the circular plate member, in order to obtain a mixture of waste gas and liquid in front of the plate member. A combination of inner and outer rotor arrays, and inner and outer stator arrays are arranged alternatingly and concentrically relative to each other, and separated from the circular plate member, and rotate about the axis of rotation. A rotary atomizer for atomizing the mixture of waste gas and liquid may be arranged on the circular plate member. Particles from the waste gas stream are transferred into the liquid.

18 Claims, 8 Drawing Sheets

(58) Field of Classification Search
CPC .......... B01D 53/505; B01D 2258/0283; B01D 1/20; B01D 1/16; B01D 1/0082; F01N 290/00; F01N 3/04; B05B 5/0407; B05B 3/1014; B05B 5/04; B05B 7/0075
See application file for complete search history.

(56) References Cited

U.S. PATENT DOCUMENTS

| | | | | |
|---|---|---|---|---|
| 5,011,520 | A * | 4/1991 | Carr | B01D 53/74 261/36.1 |
| 5,622,536 | A * | 4/1997 | Carr | B01D 47/18 96/283 |
| 6,905,537 | B1 * | 6/2005 | Isaacs | A47L 9/183 261/84 |
| 6,946,022 | B2 | 9/2005 | Kotaro | |
| 2006/0032378 | A1 * | 2/2006 | Okuda | F23J 15/022 95/218 |
| 2017/0007961 | A1 * | 1/2017 | Furuta | H02K 5/1672 |
| 2020/0261846 | A1 * | 8/2020 | Mobley | B01D 53/1475 |

FOREIGN PATENT DOCUMENTS

| | | | |
|---|---|---|---|
| DE | 545366 | C | 3/1932 |
| DE | 2653356 | A1 | 11/1976 |
| DE | 60301864 | T2 | 7/2006 |
| GB | 191022433 | A * | 7/1911 |
| JP | 2017-18894 | A | 1/2017 |
| TW | 200514615 | A | 5/2005 |
| WO | 0032299 | A1 | 6/2000 |

* cited by examiner

GAS SCRUBBER FOR REMOVING PARTICLES FROM AN EXHAUST GAS AND AN EXHAUST GAS DISPOSAL SYSTEM WITH A GAS SCRUBBER

BACKGROUND OF THE INVENTION

Technical Field and State of the Art

The invention relates to a gas scrubber for removing particles from a waste gas and to a waste gas treatment system with a gas scrubber.

In the semiconductor industry, thin layers are often applied onto various substrates by means of a chemical reaction from the gas phase (chemical vapor deposition—CVD) and these layers are then structured through the modality of etching with reactive gases. Such processes give rise to mixtures of toxic, flammable, corrosive or condensing gases. For this reason, these gas mixtures have to be treated as close as possible to the place where they are generated. The chemical reaction of these mixtures often generates ultrafine particles in the order of magnitude of <1 μm that cannot be completely washed out by conventional gas scrubbers. Even electrostatic precipitators are unsuitable in the case of very high particle concentrations.

Different technologies are employed when it comes to the use of systems for waste gas treatment as well as for waste air treatment. For instance, waste gases can be burned, washed out or freed of the ultrafine particles. In order to treat waste gases stemming from the manufacture of semiconductor products such as, for example, silicon-based solar modules or LEDs, such systems are normally operated continuously, that is to say, 24 hours per day, seven days per week. However, the invention also encompasses devices that are used for treating a waste gas stream, for example, a process gas stream. Such a waste gas stream can be re-used within a process chain after having been treated in a separator.

These problems can be solved by a generic device for treating a gas stream. In principle, gas scrubbers or else wet scrubbers are well suited to remove water-soluble gases from a waste air stream. Acidic and alkaline gases can be reduced to a low level by chemical absorption with alkaline or acidic scrubbing liquids.

Gas scrubbers serve to remove solid, liquid or gaseous contaminants from a gas, whereby the contaminants are bound to the scrubbing liquid that has been introduced into the gas stream and are precipitated together with the scrubbing liquid.

The mode of action of generic gas scrubbers or wet scrubbers or wet separators is based on an approach in which gases or particles from a gas stream laden with gases or particles are transferred into a liquid. For this purpose, appropriate interfaces have to be formed between the gas and the liquid, and a relative movement between these two phases has to be generated. One method for creating interfaces entailing the best possible intimate mixing of the gas and the liquid is to disperse one phase into the other. In other words, for example, bubble swarms are formed in a liquid, or else droplet collectives are formed in a gas, or else systems are created in which the liquid is present in the form of a more or less dispersed jet. Another fundamental way to bring the gas and the liquid into contact with each other is to pass the gas around wetted packings.

Therefore, the gas scrubber or wet scrubber constitutes a simple method for treating waste air or waste gas, whereby the gas that is to be cleaned is brought into contact with finely dispersed water droplets or with another scrubbing liquid in a parallel current or in a countercurrent, so as to clean the contaminated gas stream.

Gas scrubbers are known from the state of the art. For instance, German patent specification DE 564 429 C discloses a gas scrubber having rotating and stationary rods. The combination of the stationary and rotating rods is intended to improve the degree of purity achieved by gas scrubbers. The rotating rods can be set diagonally to the axis of the gas scrubber, and the stationary rods can be configured in the form of flat rods, blades or angled irons.

German patent specification DE 358 122 C discloses a device having two or more concentric blade rings for purposes of cleaning, cooling and mixing gases.

German laid-open application DE 369 224 A1 discloses a device to wash out tar or to absorb or enrich a scrubbing liquid. In this process, tar is to be separated out of hot gases containing tar and then employed to scrub said gases.

Moreover, European patent EP 0 048 012 B1 discloses a device for the ultrafine comminution of inorganic substances.

British patent application GB 191 022 433 A discloses a device having perforated sections. This device essentially consists of perforated cylinders or conical housings that rotate relative to each other, or else some of them rotate and some of them are stationary. The cylinders or housings are arranged concentrically in one or more chambers and they can have deflecting walls or deflecting rods that are curved inwards.

German patent application DE 33 36 840 A1 discloses a device with perforated walls for mass transport as well as for the precipitation of dust and droplets.

Moreover, PCT International Application WO 2012/146558 A2 discloses a wet separator having two single-piece corrugated sheets with different corrugation shapes and perforated flanks.

German translation of published international application DE 602 12 546 T2 or European patent EP 1 310 289 B1 discloses a gas scrubber having a housing in which an impeller rotates around its own axis, whereby a waste gas is introduced into the center of the impeller. A cleaning liquid is sprayed into the impeller. A baffle is arranged at a distance from the impeller and surrounds it. A mixture of the waste gas and the cleaning liquid strikes the baffle. The baffle in the gas scrubber promotes the agitation or movement of the waste gas and of the cleaning liquid as well as an atomization of the cleaning liquid, as a result of which dust particles contained in the waste gas are supposed to be efficiently absorbed in the cleaning liquid.

German translation of published international application DE 603 018 64 T2 or European patent EP 1 480 731 B1 discloses a gas scrubber for removing dust from a waste gas, comprising a housing in which an impeller is accommodated and supported by a shaft. Dust contained in the waste gas is supposed to be captured by means of a cleaning liquid. Moreover, a plurality of projections is provided around the impeller in such a way that the waste gas and the cleaning liquid discharged from the impeller strike these projections.

A drawback of such systems is their geometrical dimensions and large weight since, due to their size, it is sometimes difficult to transport the systems to their destination and/or installation site. Compact models of such systems have very little effect in the case of ultrafine particles, especially those with a diameter in the order of magnitude of less than 1 μm.

Before the backdrop of the disadvantages described above, the invention is based on the objective of putting forward a gas scrubber and a waste gas treatment system which ensure a higher degree of purity of a cleaned waste gas thanks to an improved removal of the particles or dust from the waste gas, namely, the invention puts forward a gas scrubber that has been optimized in terms of the specific restrictions regarding size, efficiency and pressure drop as well as a waste gas treatment system, without reducing the capacity of the waste gas treatment system.

SUMMARY OF THE INVENTION

According to the invention, a gas scrubber for removing particles, especially dust, from a waste gas is provided, comprising a housing with a waste gas inlet and a waste gas outlet, comprising an essentially circular plate member that is arranged in the housing so that it can rotate around its own axis, whereby the waste gas can be fed in via the waste gas inlet approximately in the center the plate member, and comprising an outlet nozzle for purposes of spraying a liquid, especially a cleaning liquid or a scrubbing liquid, onto the plate member in order to obtain a mixture of waste gas and liquid in front of the plate member.

Moreover, at least one inner rotor array and one outer rotor array situated at a distance from the inner rotor array are provided, both of which can be rotated around the axis.

Moreover, the gas scrubber has at least one inner stator array and one outer stator array arranged at a distance from the inner stator array, whereby, in order to generate turbulence, the rotor arrays and the stator arrays are arranged alternatingly and concentrically relative to each other, so that particles from the waste gas stream can be transferred into the liquid.

According to the invention, the gas scrubber has a rotary atomizer for atomizing the liquid, said rotary atomizer, and it is especially arranged on the circular plate member.

The sprayed-out liquid strikes the center of the rotary atomizer. The liquid is uniformly distributed in the form of a film on the surface of the rotary atomizer and is centrifuged outwards by the rotation. The liquid atomizes into fine droplets at the edge of the rotary atomizer. In particular, the diameter of the rotary atomizer can be approximately the same as the diameter of the waste gas inlet.

The mixture of droplets and gases strikes the innermost stator and is then picked up by the innermost rotor. Subsequently, the mixture is flung onto the outer stator and onto the outer rotor.

The gas is then discharged sideways or upwards in the outside area of the housing through the waste gas outlet, and the liquid is drained downwards through a liquid outlet.

The rotor-stator array generates a pressure differential by means of which the gas is conveyed from the waste gas inlet to the waste gas outlet.

The rotary atomizer effectuates a fine atomization of the liquid, especially in comparison to atomization from a nozzle using water pressure.

Moreover, there is no need for a high pressure at the liquid feed. Furthermore, no additional media are necessary as is the case with so-called two-media nozzles used for atomizing the scrubbing liquid, in other words, especially there is no need for compressed air either.

According to a first advantageous embodiment of the invention, the rotary atomizer is configured as a disk with an atomizing edge. Rotary atomizers create a narrow distribution of the droplet sizes and do not become clogged, in addition to which they require only a low liquid pressure and no compressed gas in order to generate the droplets. A thin liquid film is formed on the rotary atomizer and it becomes thinner towards the outside due to the centrifugal acceleration, and it disintegrates very uniformly into droplets at the atomization edge.

Moreover, the atomization edge of the rotary atomizer can be configured so as to be as sharp as possible. The atomization edge should be located in the center plane of the impeller channel between the plate member and a cover disk.

According to an advantageous refinement of the invention, the rotary atomizer is shaped so as to be concave towards its outer edge in order to thus yield a targeted distribution of the droplets.

The rotary atomizer exhibits a particularly small droplet spectrum and brings about an improvement in the precipitation rate. Since the atomization is achieved by means of the centrifugal forces, less admission pressure is needed in the liquid feed line than when compared to full cone nozzles. Consequently, pumps can be used that are less expensive and more resistant to dirt particles.

According to another advantageous variant of the invention, it is provided for the center of the rotary atomizer to have a convex elevation that preferably reaches or exceeds the height of the atomizing edge. This embodiment is advantageous in comparison to prior-art embodiments of rotary atomizers which have an approximately cup-like design and which are fed via the shaft and not via an external full jet nozzle; in this context, see, for instance, European revised patent EP 0 463 742 B2.

It can be provided for the interior of the rotary atomizer to have a convex configuration on its axis of rotation so that it can pick up the jet of liquid from the outlet nozzle as completely as possible, without back-splashing on the surface, and then distribute it uniformly.

In particular, the rotary atomizer can have the shape of a sombrero. The sombrero shape is characterized by the fact that the thickness is greater at the edge as well as in the center. When the total thickness of the atomizer is plotted over the diameter, the curve of the thickness approximates the shape of a sombrero.

In an advantageous refinement of the invention, the inner and outer rotor arrays are driven by a shared shaft. This simplifies the structure, and the gas scrubber is rendered altogether more compact.

In an advantageous manner, the rotor array is mechanically operatively connected to—especially arranged on—the circular plate member. Particularly when it comes to high rotational speeds, it is advantageous for the impeller to be made out of a single piece consisting of the plate member together with the rotor arrays. The rotary atomizer can be glued on or welded on since it is preferably arranged centrally on the plate member and is thus subject to a uniform force in all directions and also to a centrifugal acceleration that is not very great.

According to another advantageous embodiment of the invention, a first baffle plate is provided on the outer circumference of the gas scrubber. The mixture consisting of liquid and gas strikes the first baffle plate and is deflected to the side. An optional, second baffle plate can deflect the gas again in the opposite direction. In this process, droplets are separated out of the gas. Moreover, at the end of the first baffle plate, there can be a perforated plate through which the mixture passes. The flow is calmed in this process and decelerated in the tangential direction and deflected outward in the radial direction. This reduces the formation of new droplets from the liquid that has already been precipitated.

According to an advantageous embodiment of the invention, a second baffle plate is arranged at a distance from the first baffle plate. The gas is conveyed around the first baffle plate and then in the opposite direction around the second baffle plate, whereby liquid and gas are separated again. The gas is then discharged sideways or upwards in the outside area of the housing through the waste gas outlet, and the liquid is drained downwards through the liquid outlet. This deflection of the gas allows a separation of the liquid, and on the way, droplets still contained in the gas stream can be precipitated on the walls.

In particular, a drain slit can be provided in the second baffle plate in order to drain the liquid.

A refinement of the invention puts forward a motor, especially an electronically commutated motor, as the drive of the circular plate member. This motor has a high power density, that is to say, its power relative to the motor dimensions, in comparison, for instance, to asynchronous motors. Moreover, this type of motor displays higher energy efficiency. Its relatively smaller structural height and structural width contribute to the compactness of the gas scrubber which, in turn, allows simple integration into existing systems and devices such as, for example, waste gas treatment systems.

Furthermore, a gasket, especially a meander gasket, can be provided behind the plate member for purposes of protecting the bushing of the motor shaft at the rear of the housing. This gasket can be rinsed in the vicinity of the shaft with small amounts of a clean liquid so that particles that have been entrained over the course of time can be once again rinsed away from the shaft.

An advantageous embodiment of the invention provides for an adjustable bypass. The bypass returns gas that has already passed once through the rotor-stator array again into the rotor-stator array. This increases the gas flow through the rotor-stator array, and the pressure generated by the rotor between the waste gas inlet and the waste gas outlet is reduced. Since the gas and the liquid pass through the array several times, the interaction between the gas and the liquid is increased and a greater efficiency is attained for the precipitation of dust.

The bypass can be configured in the form of a connection of the waste gas outlet to the waste gas inlet outside of the housing. For purposes of bypass regulation, this connection can have a conventional control valve that adjusts the gas flow through the bypass.

The bypass can also be implemented as a "short-circuit" inside the housing, whereby the gas is conveyed out of the area in front of the first baffle plate behind the cover disk and from there, back into the area of the rotor and stator array. The outlet for the return flow of the gas into the rotor-stator array can be provided in the form of bypass openings in the cover disk, especially also between the rows of stators, or else in the area of the gas inlet. The bypass regulation can be effectuated, for instance, by an orifice plate with adjustable openings on the outer circumference of the stator in the area behind the cover disk.

According to another advantageous embodiment of the invention, the outlet nozzle is configured in the form of a full jet nozzle. This nozzle configured as a full jet directs a water jet onto the center of the rotary atomizer, supplying it with the liquid that is to be atomized. This type of liquid feed is considerably simpler to implement mechanically than a feed via the rotating shaft. In comparison to other nozzles, the full jet nozzle can convey more liquid at the same liquid pressure. In particular, the liquid can be fed in only in the center of the rotary atomizer, so that a uniform film can form on the surface of the rotary atomizer.

In contrast to other nozzles that are suitable for atomization, the full jet nozzle does not require narrow channels or inserts in order to generate turbulence in the nozzle. A full jet nozzle has a simple channel in the interior, no inserts for turbulence generation like, for example, hollow cone nozzles or full cone nozzles, so that it is impervious to particles contained in the liquid. For this reason, scrubbing liquid that is already contaminated with particles, for instance, from a wet scrubber located upstream, can also be used.

An advantageous refinement of the invention provides for the waste gas inlet to have a cleaning nozzle, especially a hollow cone nozzle or a full cone nozzle, for purposes of removing adhesions to the walls and/or at the rear of the full jet nozzle.

Since gases heavily laden with dust are scrubbed in the gas scrubber, dust deposits are to be expected in all areas of the feed line, especially in those places where the flow is turbulent. This is why it has to be easy to clean the entire feed line, including the waste gas inlet, or else it has to be self-cleaning. The liquid coming out of the cleaning nozzle scrubs the wall of the waste gas inlet. The advantage of a hollow cone nozzle lies in the fact that the exiting liquid is directed primarily at the wall of the gas inlet, thereby cleaning it without disrupting the formation of droplets on the rotary atomizer. A full cone nozzle could influence the liquid film on the surface of the rotary atomizer but it could also remove adhesions at the rear of the outlet nozzle. A cleaning nozzle configured as a full cone nozzle can introduce additional liquid into the rotor-stator array outside of the plane of the rotary atomizer, thus improving the efficiency of the gas scrubber.

According to another advantageous embodiment of the invention, the inner and/or outer rotor array and/or the inner and/or outer stator array has/have a plurality of projections, preferably distributed along the circumference, especially in the form of rods and/or blocks and/or blades.

Therefore, like with a fan, the projections generate a pressure that makes the gas flow, especially the cleaned gas. The projections can have a rectangular, triangular or round cross section in a plane perpendicular to the axis of the circular plate member. These can be flat rods, angled irons, square irons, wings or blade rings, which are arranged so as to rotate or so as to be stationary. There can also be blades with edges so that no curvature is necessary, thus simplifying their production. These edges can be configured so as to be rotation-symmetrical. However, arcs or radial side edges are likewise conceivable. It can be provided for the projections of the outer rotor array to be shorter than the projections of the inner rotor array. In this manner, the turbulence is increased, thus yielding a more efficient atomization.

Advantageously, the projections can extend in a direction essentially parallel to the axis of the circular plate member.

Tilted projections that especially are likewise conceivable yield aerodynamic advantages. When the rotor projections are made of a solid material, they can be simply machined from the impeller if they are parallel to the axis.

According to an advantageous refinement of the invention, it is provided for the rotor array to be made of plastic, especially fiberglass-reinforced plastic (FRP) or carbon-fiber reinforced plastic (CFRP). As an alternative or in addition, it is likewise conceivable for the stator array and/or for the circular plate member to be made of such a plastic.

Plastic is corrosion-proof and it is relatively lighter in weight than corresponding versions made of metal. By using a solid material or else very sturdy composite materials such as FRP or CFRP, very small diameters and high rotational frequencies are possible. Moreover, a rotor and/or stator array made of plastic is relatively lighter in weight. All in all, this translates into a compact design of the gas scrubber for decentralized applications. Moreover, the versions made of plastic are less expensive than those made of other materials such as, for instance, corrosion-proof metal alloys.

The rotor array can be milled out of a solid material together with the circular plate member. As a result, there is no need for glued or screwed connections, and an excellent mechanical stability is ensured that allows high rotational speeds.

In a particularly advantageous embodiment of the invention, the openings for the waste gas outlet and for the liquid outlet are arranged in such a way that the gas scrubber can be mounted in a vertical as well as in a horizontal position, thereby ensuring high flexibility when it comes to its installation. In other words, the openings are arranged in such a way that, in the vertical as well as in the horizontal installed positions of the gas scrubber, the openings for the liquid outlet face downwards and the openings for the waste gas outlet face sideways or upwards.

An independent idea of the invention puts forward a waste gas treatment system with a gas scrubber, especially of the type described above.

Advantageously, the waste gas treatment system can have a thermal reactor, particularly a combustion reactor and/or a wet scrubber.

The combination of a thermal method and wet scrubbing is normally employed in the semiconductor industry for purposes of treating flammable, toxic and corrosive gas mixtures. The oxidation of, for example, siliceous components gives rise to very fine dust having particle sizes well below 1 pm, which can only be partially scrubbed out by conventional wet scrubbers such as, for example, packed columns. For this reason, in processes involving a very pronounced formation of particles, there is a need for an additional treatment step in order to reduce the remaining dust emission.

In a refinement of the invention, the gas scrubber is arranged downstream from the wet scrubber as seen in the direction of flow of the waste gas stream.

The compactness of the gas scrubber allows for a compact installation on the wet scrubber, often even inside an enclosure of the waste gas treatment system. Another advantageous aspect of this arrangement is the reduced concentration of corrosive gases as well as a lower temperature of the mixture. Moreover, the scrubbing liquid from the wet scrubber can be employed to supply the gas scrubber, so that there is no need for additional consumption of water or liquid. Furthermore, no additional pump is required for the liquid. After all, the pump output of the wet scrubber circulation system is normally sufficient to feed the liquid into the outlet nozzle of the gas scrubber since it only requires a low pressure.

According to another variant of the invention, it can be provided for the gas scrubber to be arranged downstream from the wet scrubber as seen in the direction of flow of the waste gas stream, and for the wet scrubber to be arranged downstream from the thermal reactor.

In this manner, the gas scrubber is not arranged directly downstream from the thermal reactor, so that the gas is already at a lower temperature. A greater distance from the reactor offers protection against overheating caused by residual heat from the thermal reactor, especially in the case of a sudden failure of the device.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

In this context, the following is shown, at times schematically.

DETAILED DESCRIPTION

Figure 1:
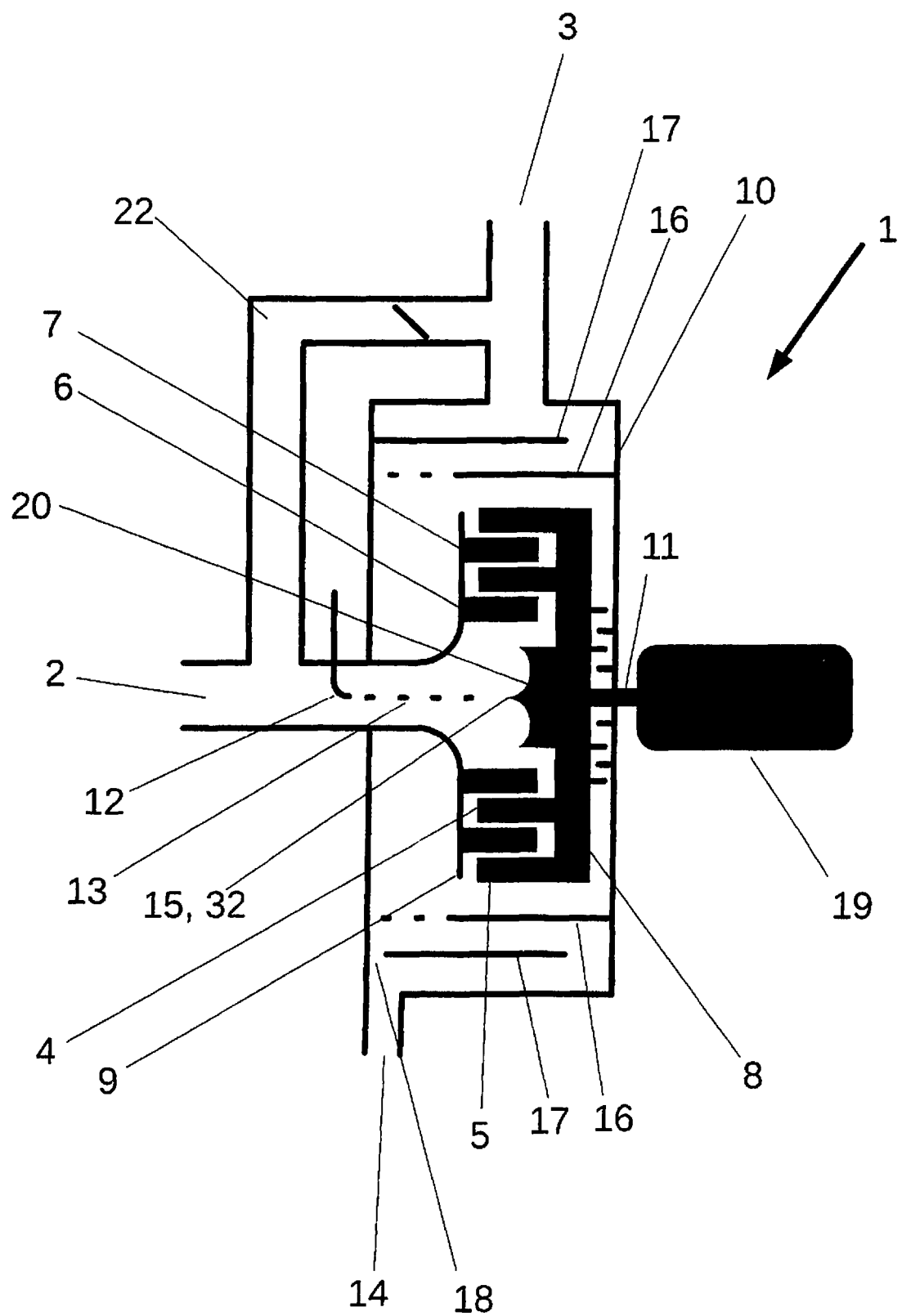
FIG. 1 a schematic view of the gas scrubber with a horizontal axis of rotation.

For the sake of greater clarity, identical components or those having the same effect are provided with the same reference numerals in the figures of the drawing described below, making reference to an embodiment.

FIG. 1 shows a gas scrubber 1 for removing particles, especially dust, from a waste gas.

In a housing 10 of the gas scrubber, there is a waste gas inlet 2 for the waste gas that is to be cleaned and a waste gas outlet 3 for the gas that has been cleaned.

The gas scrubber 1 also has an essentially circular plate member 8 that is arranged in the housing 10 so that it can rotate around its own axis 11. The waste gas can be fed in approximately in the center 15 of the plate member 8 via the waste gas inlet 2.

FIG. 1 also shows an outlet nozzle 12 for spraying a liquid 13, especially a cleaning or scrubbing liquid, onto the plate member 8, in order to obtain a mixture consisting of waste gas and liquid 13 in front of the plate member 8.

In the present embodiment, the outlet nozzle 12 can be configured in the form of a full jet nozzle 26 and it can direct a liquid jet onto the center 32 of the rotary atomizer 20, thus supplying it with the liquid 13 that is to be atomized. This type of liquid feed is considerably simpler to implement mechanically than a feed via the rotating shaft. In comparison to other nozzles, the full jet nozzle can convey more liquid at the same liquid pressure. In particular, the liquid 13 can be fed in only in the center of the rotary atomizer 20, so that a uniform film can form on the surface of the rotary atomizer 20.

The gas scrubber 1 also has at least one inner rotor array 4 and one outer rotor array 5 arranged at a distance from the inner rotor array 4, both of which can be rotated around the shaft 11.

Moreover, there is at least one inner stator array 6 and one outer stator array 7 arranged at a distance from the inner stator array 6, whereby, in order to generate turbulence, the rotor arrays 6, 7 and the stator arrays 4, 5 are arranged alternatingly and concentrically relative to each other, so that particles from the waste gas stream can be transferred into the liquid 13.

FIG. 1 shows an embodiment with a horizontal axis of rotation.

Figure 2:
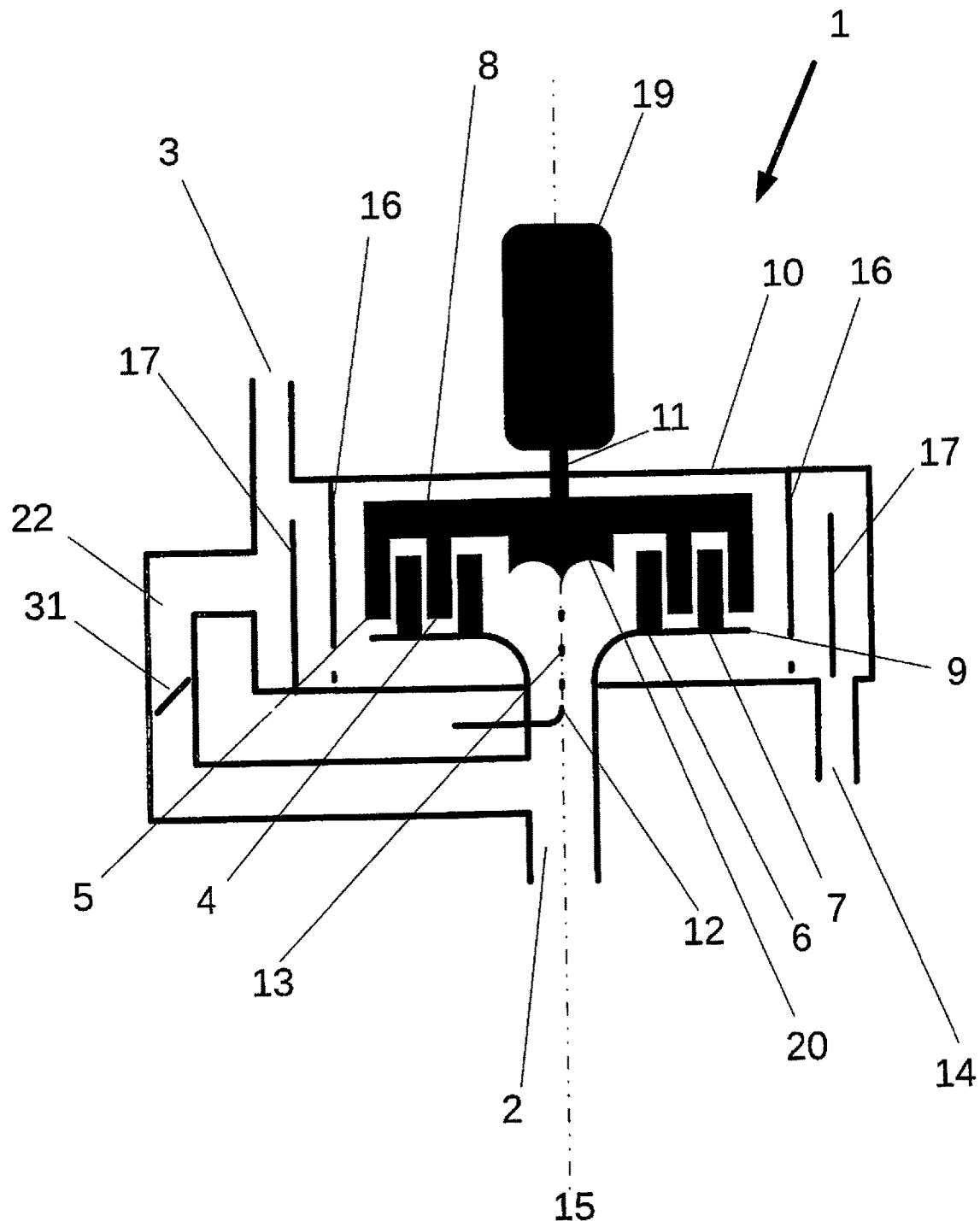
FIG. 2 a view of the gas scrubber with a vertical axis of rotation.

FIG. 2 shows an embodiment with a vertical axis of rotation.

In the present embodiment as shown in FIGS. 1 and 2, the inner and outer rotor arrays 4, 5 are driven by a shared shaft. For this purpose, the rotor arrays 4, 5 are mechanically operatively connected—in the present case, arranged on— the circular plate member 8.

A motor 19, especially an electronically commutated motor, is provided as the drive of the circular plate member 8.

Figure 4:
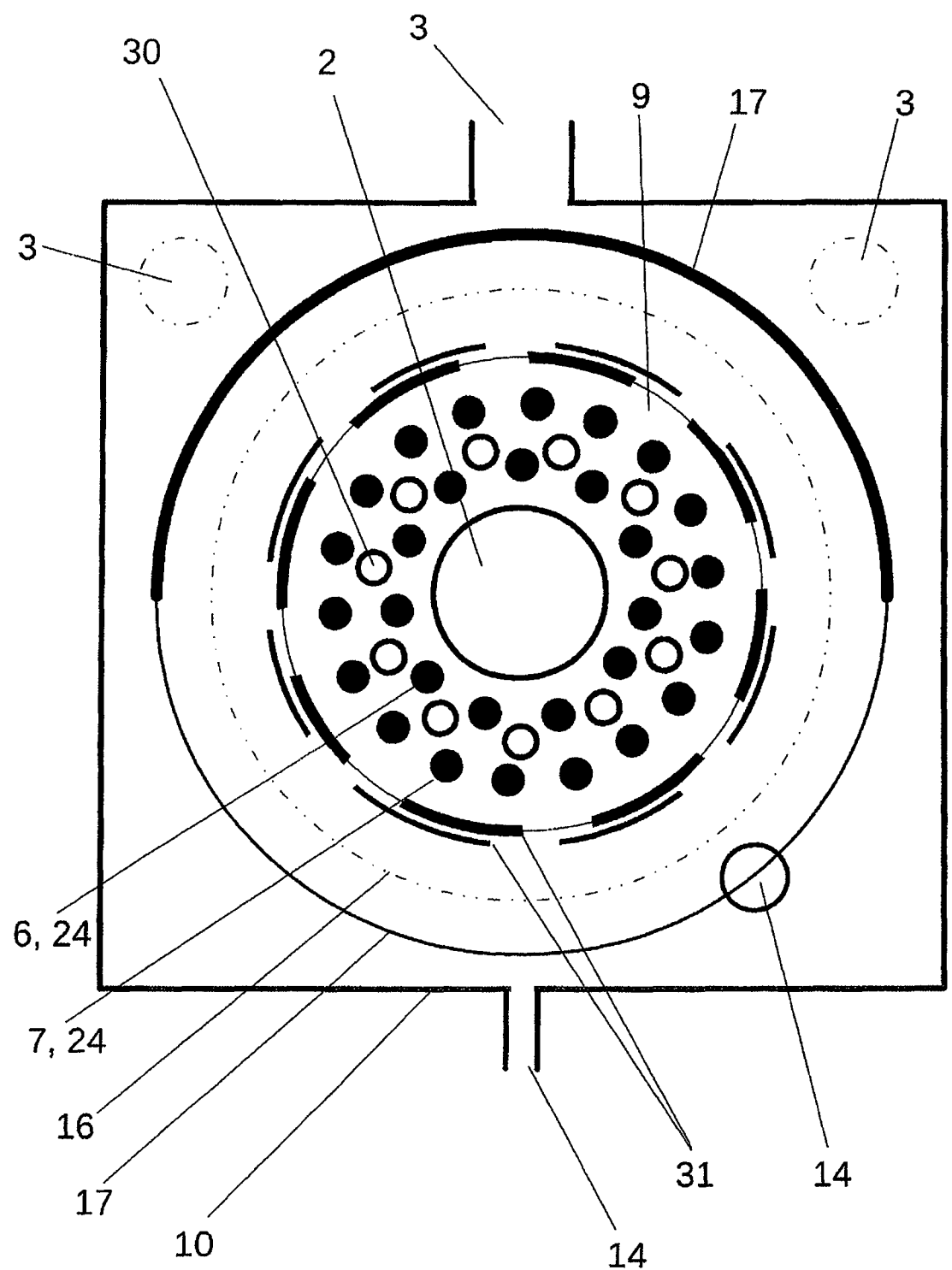
FIG. 4 a schematic view of the gas scrubber with stator arrays on a cover disk.
Figure 8:
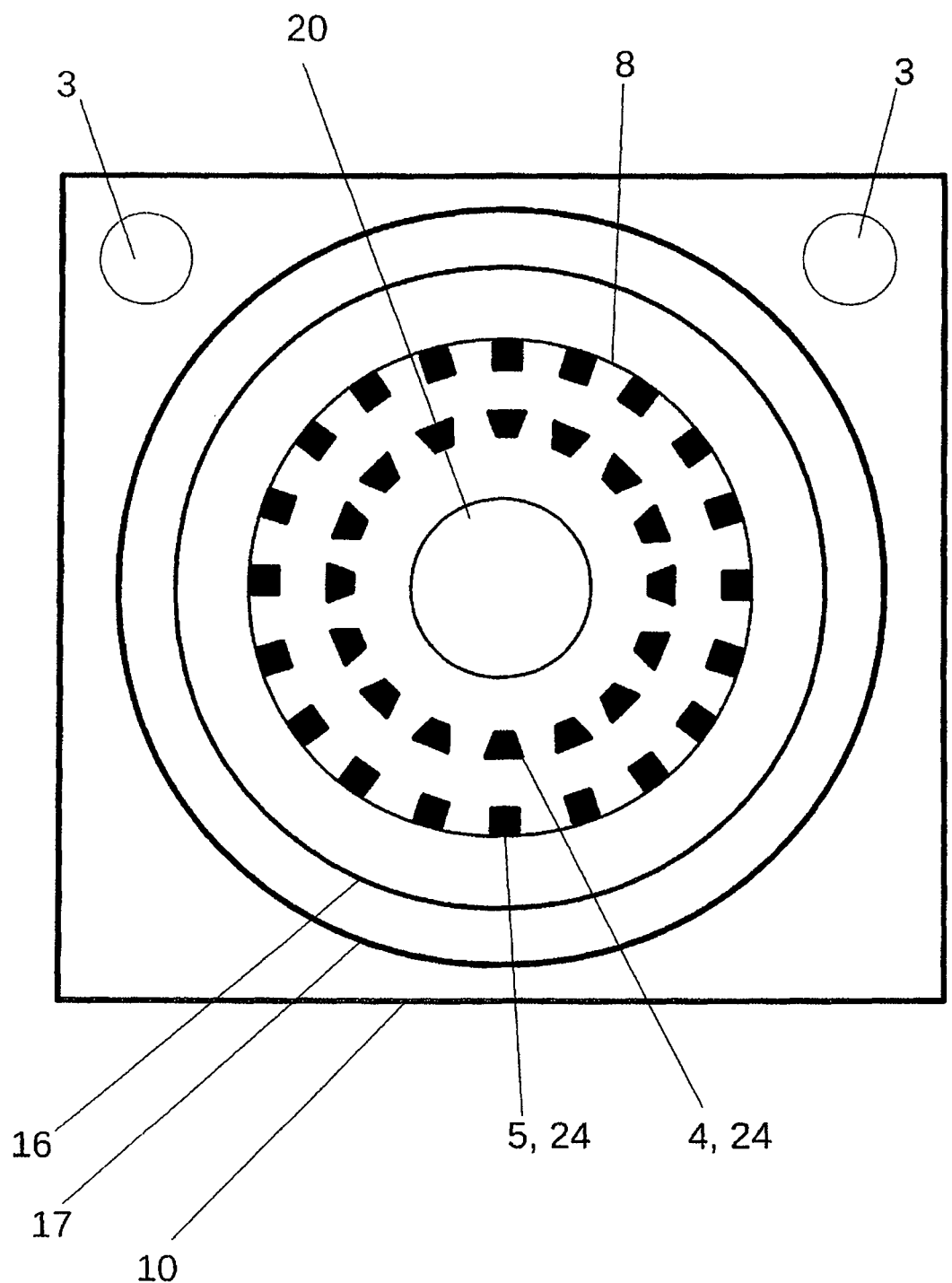

As can be seen in FIG. 8 and FIG. 4, in the present embodiment, the inner and/or the outer rotor array 4, 5 and/or the inner and the outer stator array 6, 7 have a plurality of projections 24, preferably distributed along the circumference, which here are configured in the form of rods. Other geometrical shapes such as blocks or flat rods, angled irons, square irons, wings or blade rings, which are arranged so as to rotate or so as to be stationary, are all likewise conceivable. There can also be blades with edges so that no curvature is necessary, thus simplifying their production.

As can be seen in FIGS. 1 and 2, the projections 24 extend in a direction essentially parallel to the shaft 11 of the circular plate member 8. Therefore, like with a fan, the projections 24 generate a pressure that makes the gas flow, especially the cleaned gas.

The rotor arrays 4, 5 and/or the stator arrays 6, 7 and/or the circular plate member 8 can be made of plastic, especially fiberglass-reinforced plastic (FRP) or carbon-fiber reinforced plastic (CFRP).

FIGS. 1 and 2 likewise show a first baffle plate 16 which is provided on the outer circumference of the gas scrubber 1. A second baffle plate 17 is arranged at a radial distance from the first baffle plate 16.

The mixture consisting of liquid 13 and gas strikes the first baffle plate 16 and is deflected to the side. The second baffle plate 17 can deflect the gas again in the opposite direction. In this process, droplets are separated out of the gas. Moreover, at the end of the baffle plate 16, there can be a perforated plate through which the mixture passes. The flow is calmed in this process and decelerated in the tangential direction and deflected outward in the radial direction. This reduces the formation of new droplets from the liquid that has already been precipitated.

The second baffle plate 17 is arranged at a radial distance from the first baffle plate 16. The gas is conveyed around the first baffle plate 16 and then in the opposite direction around the second baffle plate 17, whereby liquid and gas are separated again. The gas is then discharged sideways or upwards in the outside area of the housing 10 through the waste gas outlet 3, and the liquid is drained downwards through the liquid outlet 14. This deflection of the gas allows a separation of the liquid, and on the way, droplets still contained in the gas stream can be precipitated onto the walls. In particular, a drain slit 18 can be provided in the second baffle plate 17 in order to drain the liquid.

Figure 5:
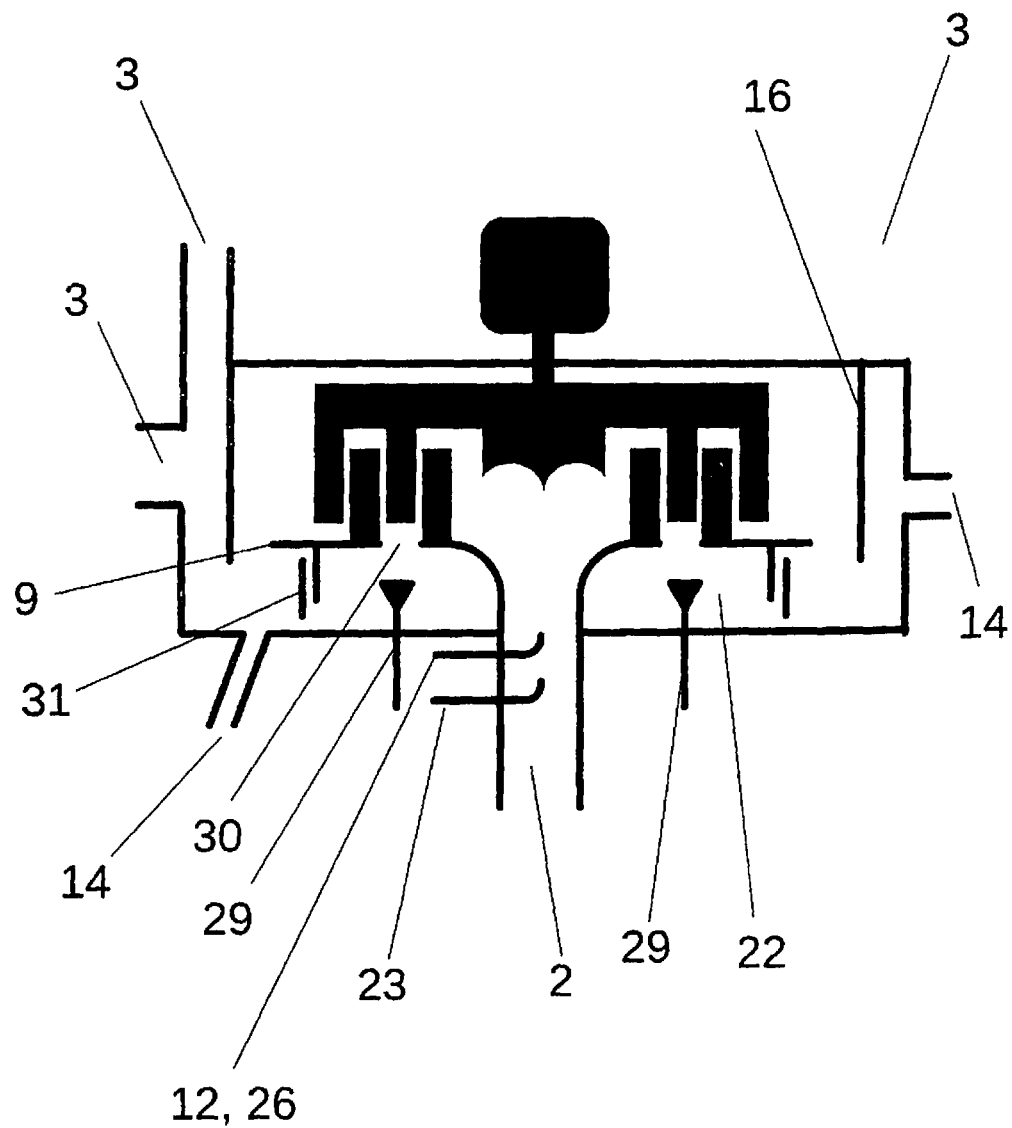
FIG. 5 an embodiment of the gas scrubber with a bypass and bypass openings.

As can be seen in FIG. 5, the openings for the waste gas outlet 3 and for the liquid outlet 14 are arranged in such a way that the gas scrubber 1 can be mounted in a vertical as well as in a horizontal position. Depending on the installed position, the openings that are not needed can be closed with a blind flange.

Figure 3:
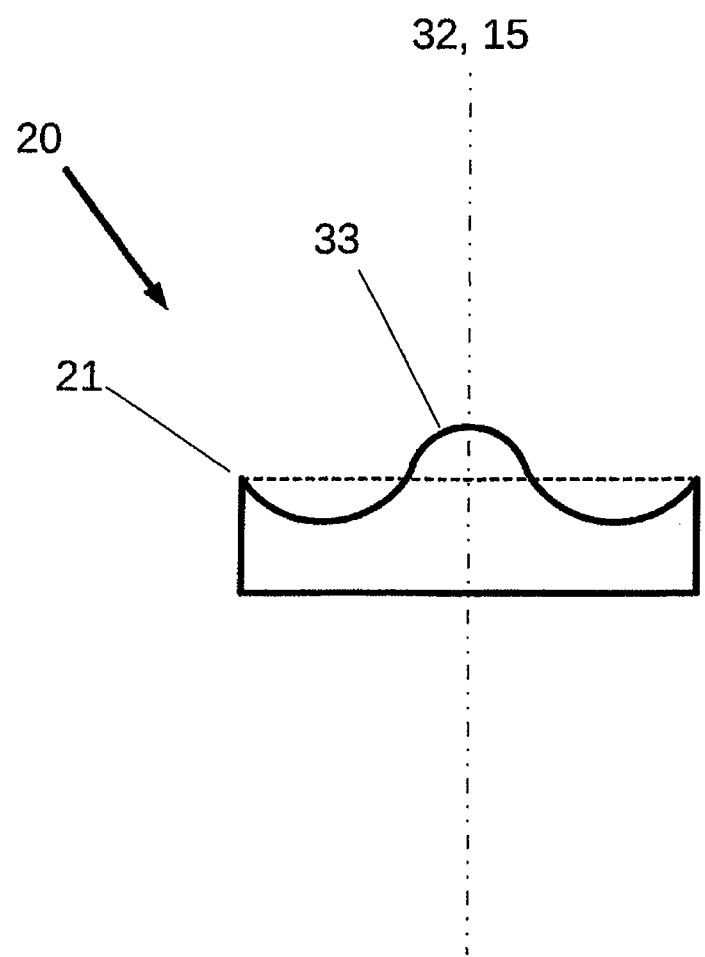
FIG. 3 a rotary atomizer.

FIGS. 1, 2, 5 and 6 show the rotary atomizer 20 which serves to atomize the mixture consisting of waste gas and liquid 13 which, in the present embodiment, is arranged on the circular plate member 8. The detailed view as shown in FIG. 3 likewise depicts the rotary atomizer 20. In this context, the rotary atomizer 20 is arranged on the circular plate member 8. The rotary atomizer 20 effectuates a fine atomization of the liquid 13, especially in comparison to atomization from a nozzle using water pressure.

As can also be seen in FIG. 3, the rotary atomizer 20 is configured as a disk with an atomization edge 21 and it is shaped so as to be concave towards its outer edge in order to pick up the jet of liquid 13 from the outlet nozzle 12 as completely as possible, without back-splashing on the surface, and then distribute it uniformly. Moreover, the center 32 of the rotary atomizer 20 has a convex elevation 33 that preferably reaches or exceeds the height of the atomization edge 21.

In particular, the rotary atomizer 20 can have the shape of a sombrero. The sombrero shape is characterized by the fact that the thickness is greater at the edge as well as in the center. When the total thickness of the atomizer is plotted over the diameter, the curve of the thickness approximates the shape of a sombrero.

The sprayed-out liquid 13 strikes the center 32 of the rotary atomizer 20. The liquid 13 is uniformly distributed in the form of a film on the surface of the rotary atomizer 20 and is centrifuged outwards by the rotation. The liquid 13 atomizes into fine droplets at the edge of the rotary atomizer 20. In particular, the diameter of the rotary atomizer 20 can be approximately the same as the diameter of the waste gas inlet 2.

Subsequently, the mixture consisting of droplets and gases strikes the inner stator array 6 and is then picked up by the inner rotor array 4. Subsequently, the mixture is flung onto the outer stator array 7 and onto the outer rotor array 5.

As mentioned above, the mixture consisting of liquid 13 and gas strikes the first baffle plate 16 and is deflected to the side, and it can then be deflected again in the opposite direction by the second baffle plate 17.

The gas is then discharged sideways or upwards in the outside area of the housing 10 through the waste gas outlet, and the liquid 13 is drained downwards through a liquid outlet 14.

As can especially be seen in FIG. 5, the waste gas inlet 2 has a cleaning nozzle 23, especially a hollow cone nozzle or a full cone nozzle, for purposes of removing adhesions to the walls and/or at the rear of the full jet nozzle 26.

The rotor-stator array generates a pressure differential by means of which the gas is conveyed from the waste gas inlet 2 to the waste gas outlet 3.

FIGS. 1, 2, 5 and 6 show an adjustable bypass 22. The bypass 22 returns gas that has already passed once through the rotor-stator array back into the rotor-stator array. This increases the gas flow through the rotor-stator array, and the pressure generated by the rotor array 4, 5 between the waste gas inlet 2 and the waste gas outlet 3 is reduced. Since the gas and the liquid 13 pass through the array 4, 5 several times, the interaction between the gas and the liquid 13 is increased and a greater efficiency is attained for the precipitation of the particles and dust.

The bypass 22 can be configured in the form of a connection of the waste gas outlet 3 to the waste gas inlet 2 outside of the housing 10. For purposes of bypass regulation 31, this connection can have a conventional control valve that adjusts the gas flow through the bypass 22.

The bypass 22 can also be implemented as a "short-circuit" inside the housing 10, whereby the gas is conveyed out of the area in front the first baffle plate 16 behind the cover disk 9 and from there, back into the area of the rotor and stator array. The outlet for the return flow of the gas into the rotor-stator array can be provided in the form of bypass openings 30 in the cover disk 9, especially also between the stator arrays 6, 7, or else in the area of the gas inlet 2.

The bypass regulation 31 can be effectuated, for instance, by an orifice plate with adjustable openings on the outer circumference of the stator in the area behind the cover disk 9.

FIG. 4 shows a view from above onto the cover disk 9 when the housing lid and the motor 19 with the circular plate member 8 have been removed. The stator arrays 6, 7 are arranged on the cover disk 9. Bypass openings 30 perforate the cover disk so that the gas from the bypass can flow back again into the rotor-stator array. The cover disk 9 improves the inflow.

The waste gas inlet 2 can be seen centrally from below. The bypass regulation 31 is effectuated by a rotatable orifice plate that is arranged on the circumference of the cover disk 9 between the cover disk 9 and the bottom of the housing. The second baffle plate 17 is configured so as to be closed at the halfway point of the housing towards the waste gas outlet 3 all the way to the housing lid so that the gas can flow only in the other half of the housing into the outer area of the housing 10, thus having to travel a longer distance through the housing 10 until it reaches the waste gas outlet 3. This translates into a better precipitation of droplets out of the gas stream.

FIG. 5 shows an embodiment with bypass openings 30 in the cover disk 9 between the inner and outer stator arrays 6, 7. In this context, auxiliary nozzles 29 can bring additional liquid 13 through the bypass openings 30 into the area of the outer stator array 7 and the rotor array 5. This can improve the efficiency of the gas scrubber 1 if the liquid 13 which had been sprayed by the rotary atomizer 20 onto the first rotor array has already partially flowed onto the cover disk 9 or onto the circular plate member 8, and therefore is no longer available to interact with the particles or the dust contained in the gas.

The auxiliary nozzles 29 can be directed towards the bypass openings 30 in the cover disk 9 or else sideways, for example, tangentially, into the space used as the bypass 22 behind the cover disk 9.

Figure 6:
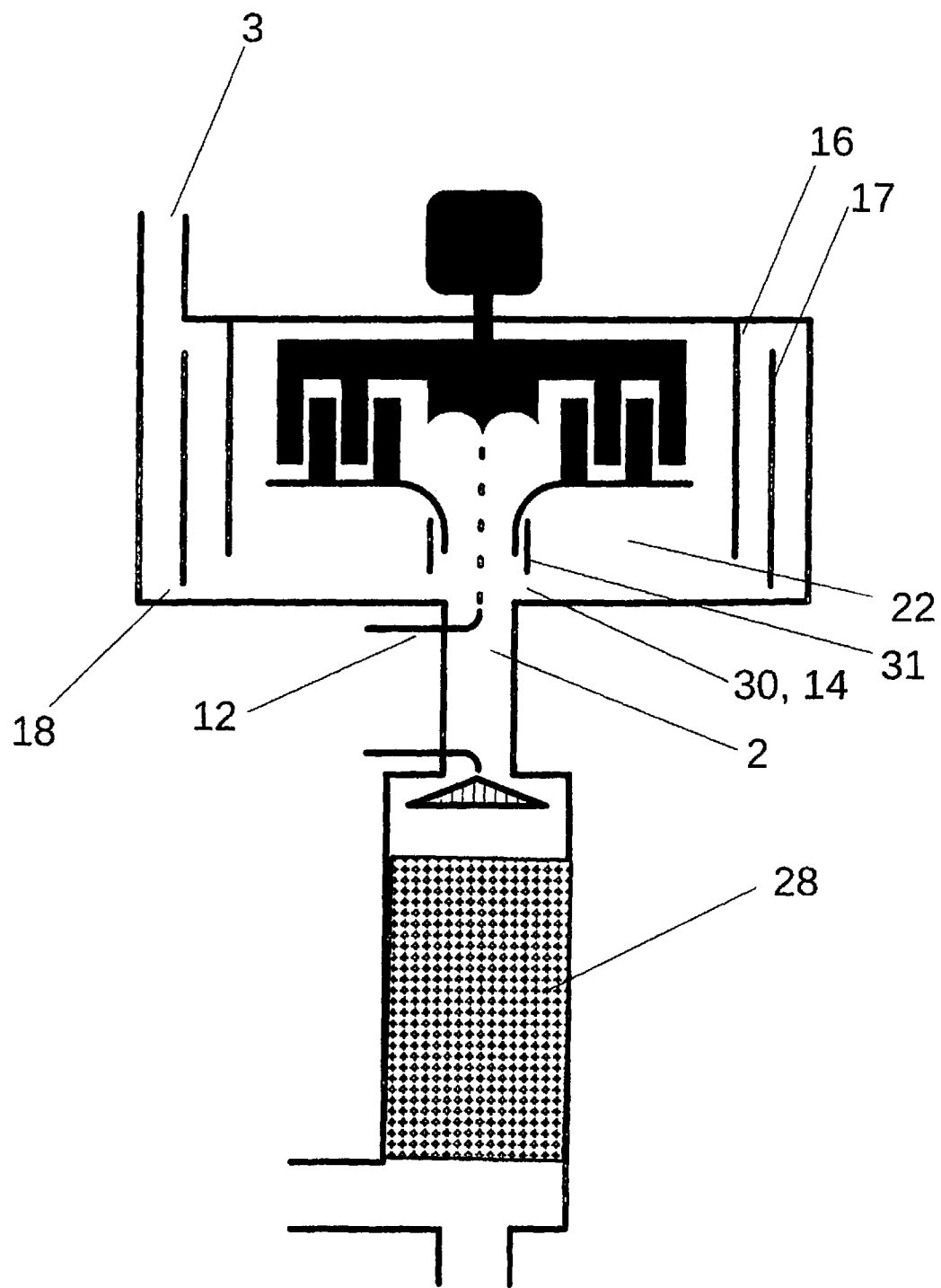
FIG. 6 a waste gas treatment system with a gas scrubber and a wet scrubber.
Figure 7:
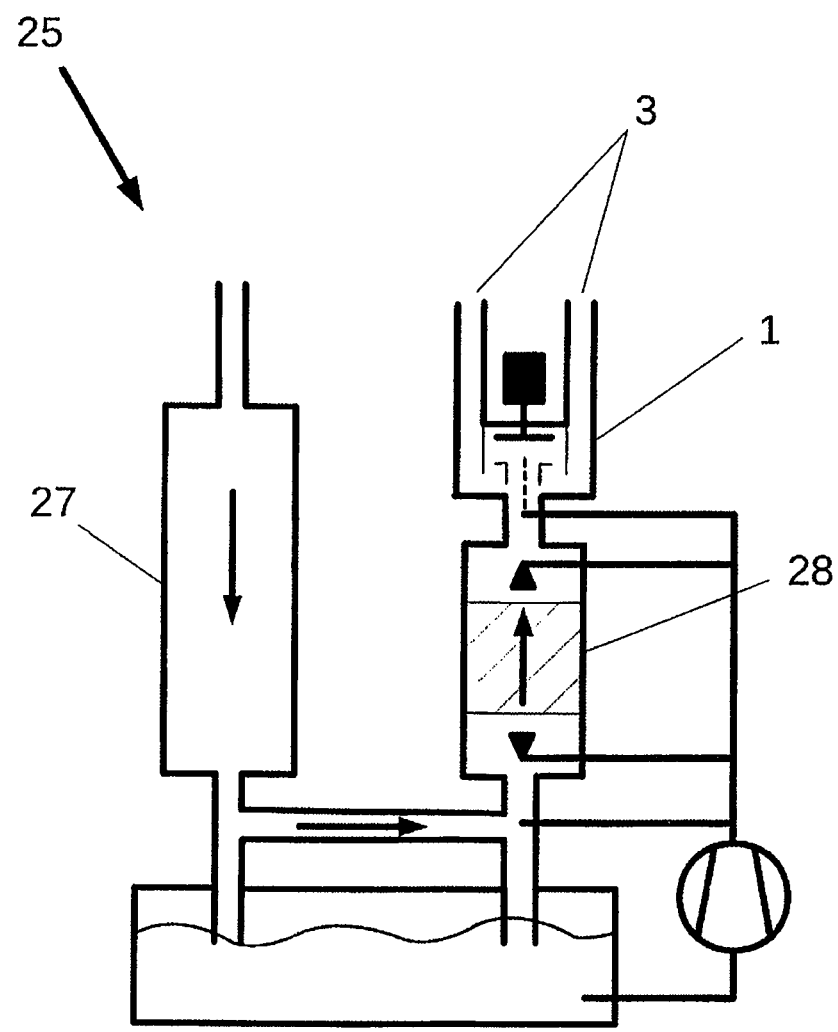
FIG. 7 a waste gas treatment system with a gas scrubber, a wet scrubber and a thermal reactor, and FIG. 8 a schematic view of the gas scrubber with an impeller having a circular plate member, a rotary atomizer and rotor arrays.

Within the scope of the invention, a waste gas treatment system 25 is being put forward which can comprise a gas scrubber 1 of the type described above. FIGS. 6 and 7 show embodiments of such a waste gas treatment system 25. The combination of a thermal method and wet scrubbing is normally employed in the semiconductor industry for purposes of treating flammable, toxic and corrosive gas mixtures.

FIG. 6 shows an embodiment of the waste gas treatment system 25 with bypass openings 30 in the area of the waste gas inlet 2. In this context, the bypass regulation 31 can be carried out directly by changing the free cross section of the bypass openings 30 employing a sliding or rotating orifice plate.

In the embodiment shown in FIG. 6, the gas scrubber 1 is installed on a wet scrubber 28. Here, the bypass openings 30 can simultaneously serve as the liquid outlet 14, so that the draining liquid drains via the waste gas inlet 2 directly into the wet scrubber 28. In this process, a portion of the waste gas circulates multiple times through the gas scrubber 1 and is thus treated multiple times. This increases the efficiency of the gas scrubber.

Since, in order to achieve a high degree of efficiency of the dust precipitation, it is always necessary to select the highest possible rotational speed for the plate member 8, the pressure differential over the gas scrubber 1 between the waste gas inlet 2 and the waste gas outlet 3 is adjusted by regulating the bypass cross section via the modality of bypass regulation 31. Due to the cooling of the gas by the liquid contained in the gas scrubber 1, the throughput rate or the pressure can be regulated by means of the bypass 22 without the device heating up. On the other hand, in "dry systems", that is to say, in the case of fans, this is only possible to a limited extent without liquid cooling since the circulating air in the system would heat up and the system would overheat.

FIG. 7 shows an embodiment of the waste gas treatment system 25 with a thermal reactor 27 which can be configured as a combustion reactor. A wet scrubber 28 is likewise put forward.

In the present embodiment, the gas scrubber 1 is arranged downstream from the wet scrubber 28 as seen in the direction of flow of the waste gas stream and the wet scrubber 28 is arranged downstream from the thermal reactor 27. In this manner, the gas scrubber 1 is not arranged directly downstream from the thermal reactor 27, so that the gas is already at a lower temperature.

Owing to the compactness of the gas scrubber 1, it is possible to attain a compact installation on the wet scrubber 28. Another advantageous aspect of this arrangement is the reduced concentration of corrosive gases as well as a lower temperature of the mixture. Moreover, the scrubbing liquid from the wet scrubber 28 can be employed as the liquid 13, so that there is no need for additional consumption of water or liquid.

LIST OF REFERENCE NUMERALS 1 gas scrubber
2 waste gas inlet
3 waste gas outlet
4 inner rotor array
5 outer rotor array
6 inner stator array
7 outer stator array
8 circular plate member
9 cover disk
10 housing
11 axis/shaft of the plate member
12 outlet nozzle
13 liquid
14 liquid outlet
15 middle of the plate member
16 first baffle plate
17 second baffle plate
18 drain slit
19 motor
20 rotary atomizer
21 atomization edge
22 bypass
23 cleaning nozzle
24 projections
25 waste gas treatment system
26 full jet nozzle
27 thermal reactor
28 wet scrubber 29 auxiliary nozzle
30 bypass opening
31 bypass regulation
32 center of the rotary atomizer
33 convex elevation of the rotary atomizer

The invention claimed is:

1. A gas scrubber (1) for removing particles from a waste gas, comprising:
    a housing (10) with a waste gas inlet (2) and a waste gas outlet (3);
    a substantially circular plate member (8) defining a center (15) that is arranged in the housing (10) and configured to rotate about its own axis (11) and configured so that waste gas fed into the housing via the waste gas inlet (2) is directed toward the center (15) of the plate member (8);
    an outlet nozzle (12) configured to spray a liquid (13) onto the circular plate member (8) in order to obtain a mixture of waste gas and liquid (13) in front of the circular plate member (8);
    at least one inner rotor array (4) and one outer rotor array (5) situated at a distance from the inner rotor array (4), both of which are rotatable around the axis (11);
    at least one inner stator array (6) and one outer stator array (7) arranged at a distance from inner stator array (6), with the rotor arrays (4, 5) and the stator arrays (6, 7) arranged alternatingly and concentrically relative to each other, and configured to create turbulence so that particles from the waste gas stream can be transferred into the liquid (13); and
    a rotary atomizer (20) configured as a disk with an atomization edge (21) for atomizing the liquid (13) arranged on the circular plate member (8), wherein the atomizing edge (21) defines a height, and wherein the rotary atomizer (2) defines a center (32), and said center (32) has a convex elevation (33) that reaches or exceeds the height of the atomizing edge (21).

2. The gas scrubber (1) according to claim 1, wherein the rotary atomizer (20) is shaped so as to be concave towards its outer edge.

3. The gas scrubber (1) according to claim 1, wherein the inner and outer rotor arrays (4, 5) are driven by a shared shaft.

4. The gas scrubber (1) according to claim 1, wherein the rotor array (4, 5) is mechanically operatively connected to the circular plate member (8).

5. The gas scrubber (1) according to claim 1, further comprising a first baffle plate (16) on the outer circumference of the gas scrubber (1).

6. The gas scrubber (1) according to claim 5, further comprising a second baffle plate (17) arranged at a radial distance from the first baffle plate (16).

7. The gas scrubber (1) according to claim 1, further comprising a motor (19) to drive of the circular plate member (8).

8. The gas scrubber (1) according to claim 1, further comprising an adjustable a bypass (22) configured to return waste gas into one or more of the rotor arrays (4, 5) and/or the stator arrays (6, 7).

9. The gas scrubber (1) according to claim 1, wherein the outlet nozzle (12) is configured in the form of a full jet nozzle (26).

10. The gas scrubber (1) according to claim 9, wherein the waste gas inlet (2) has a cleaning nozzle (23) configured for removing adhesions from the walls and/or at the rear of the full jet nozzle (26).

11. The gas scrubber (1) according to claim 1, wherein the inner and/or the outer rotor array (4, 5) and/or the inner and/or outer stator array (6, 7) has/have a plurality of projections (24) distributed along the circumference.

12. The gas scrubber (1) according to claim 11, wherein the projections (24) extend in a direction essentially parallel to the axis (11) of the circular plate member (8).

13. The gas scrubber (1) according to claim 1, wherein the rotor array (4, 5) and/or the stator array (6, 7) and/or the circular plate member (8) is/are made of plastic, fiberglass-reinforced plastic (FRP) or carbon-fiber reinforced plastic (CFRP).

14. The gas scrubber (1) according to claim 1, wherein the waste gas outlet (3) defines an opening, and the liquid outlet (14) defines a second opening, and wherein the opening and the second opening are arranged to permit the gas scrubber (1) to be operably mounted either in a vertical or in a horizontal position.

15. A waste gas treatment system (25) with a gas scrubber (1) according to claim 1.

16. The waste gas treatment system (25) according to claim 15, comprising a thermal reactor (27) selected from the group consisting of a combustion reactor and a wet scrubber (28).

17. The waste gas treatment system (25) according to claim 16, wherein the thermal reactor (27) is a wet scrubber (28) and wherein the gas scrubber (1) is arranged downstream from the wet scrubber (28) as seen in the direction of flow of the waste gas stream.

18. The waste gas treatment system (25) according to claim 16, wherein the gas scrubber (1) is arranged downstream from the wet scrubber (28) as seen in the direction of flow of the waste gas stream, and the wet scrubber (28) is arranged downstream from the thermal reactor (27).

* * * * *